United States Patent Office 2,939,666
Patented June 7, 1960

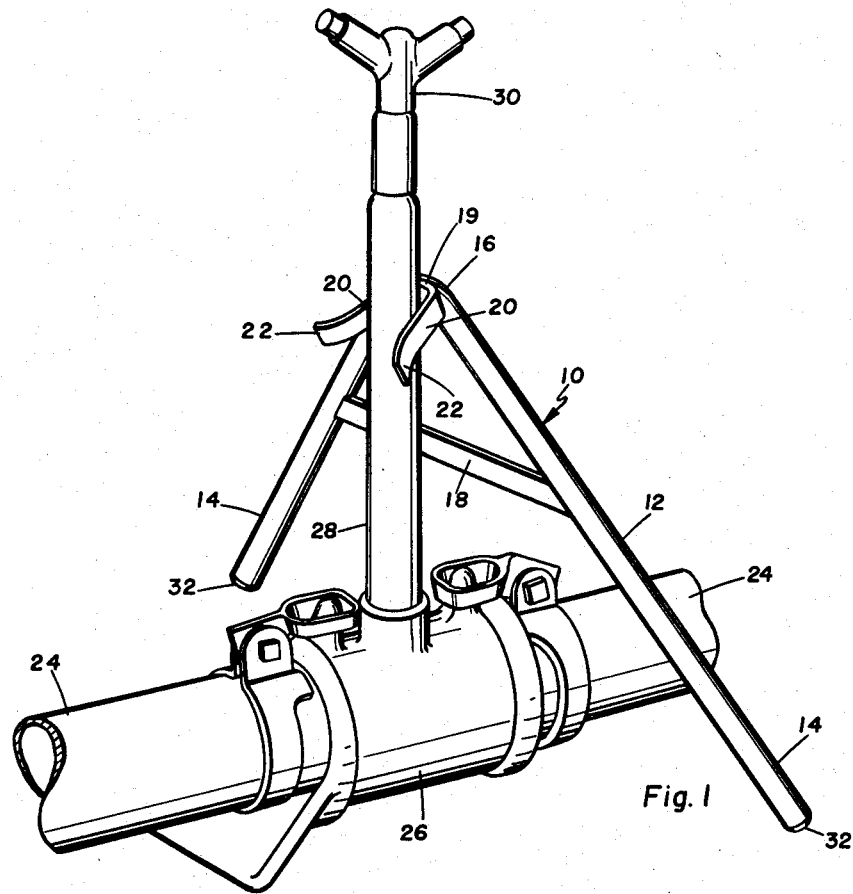
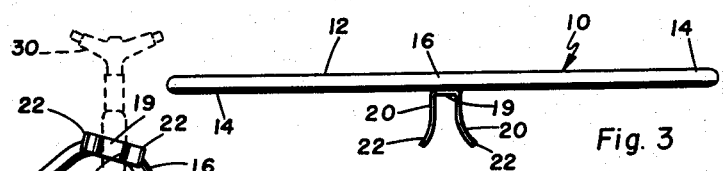
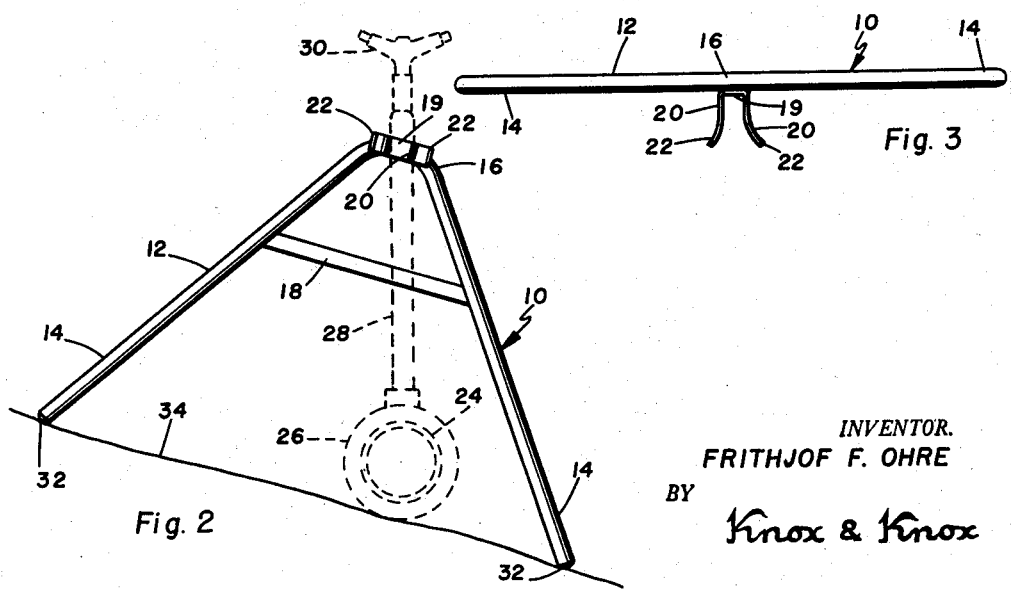

2,939,666
STABILIZER FOR PORTABLE IRRIGATION EQUIPMENT

Frithjof F. Ohre, 9082 Friars Road, San Diego, Calif.

Filed May 13, 1955, Ser. No. 508,140

2 Claims. (Cl. 248—76)

The present invention relates generally to sprinklers and more particularly to a stabilizer for portable irrigation equipment.

The primary object of this invention is to provide a stabilizer which engages the risers and stabilizes the complete sprinkler assembly in a portable irrigation system, even on irregular or sloping terrain, so that each sprinkler riser is held in its optimum position for the most efficient sprinkling pattern, this position ordinarily being an upright position.

Another object of this invention is to provide a stabilizer which is a simple unitary frame easily applied to individual sprinkler units when the portable irrigation system is laid down.

Another object of this invention is to provide a stabilizer which in itself is easily portable and does not interfere with the portability of the other units of the irrigation system.

Another object of this invention is to provide a stabilizer which is adapted for fabrication from many different materials, so that the choice of material can be according to the dictates of availability and price considerations, the exact sizes and proportions being matters easily determined to suit particular conditions and needs.

Another object of this invention is to provide a stabilizer which is practicable and inexpensive to manufacture.

Finally, it is an object to provide a stabilizer of the aforementioned character which is simple and convenient to use and which will give generally efficient and durable sereviice.

With these and other objects definitely in view, this invention consists in the novel construction, combination and arrangement of elements and portions, as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Fig. 1 is a perspective view showing the stabilizer supporting a sprinkler unit of an irrigation system.

Fig. 2 is a front elevation view showing the stabilizer supporting a sprinkler unit on a sloping ground.

Fig. 3 is a top plan view of the stabilizer.

Referring now to the drawing in detail, the stabilizer 10 comprises a rigid A-frame 12 formed from a single piece of tubular material, such as metal pipe, which is bent in a general V-shape to provide a pair of outwardly and downwardly extending legs 14 jointed at the apex by a line omitted cross bar 18 which is terminally fixed to the legs a short distance from the bight portion 16 and gives the A-like appearance to the frame 12. Fixed to the bight portion 16 and extending substantially normal to the A-frame 12 is a generally U-shaped riser-engaging element having a base portion 19 which is rigidly secured, as by welding to said bight portion 16, and unitary with the base portion 19 are generally parallel arms 20 which, with said base portion 19, define a pocket to receive the intermediate portion of the riser hereinafter mentioned. The outer ends of the arms 20 are curved outwardly or flared to constitute guides 22 for the riser. It will be understood that this equipment must be suitable for rough and sometimes hurried use and the guides 22 facilitate the placement of the stabilizers on the risers, although the parallel arms prevent inadvertent disengagement.

The irrigation equipment with which the stabilizer 10 is used is shown fragmentarily in Fig. 1 and includes a plurality of extension pipes 24 interconnected by couplings 26. Extending upwardly from each coupling 26 is a riser 28 at the top of which is a rotary sprinkler head 30. The pipe and riser structure shown is typical of equipment in wide, current use and is exemplary only. It should be understood that no claim is made to invention in the pipe and riser structure, nor is the stabilizer limited to use with the specific equipment shown. Rounded feet 32 are fixed to the lower ends of the legs 14, the rounded form having been found to be more effectively self-cleaning.

Portable irrigation is pipe laid on the ground in such a manner as to provide a desirable sprinkler distribution for efficient irrigation. The pipes and couplings are easily connected and disconnected so that the entire system is highly portable and can be moved to different locations as desired. While the assembled system is reasonably firm and the risers may remain upright, extreme lengths of piping are sufficiently flexible to allow the risers to lean or to fall and disrupt the sprinkler pattern. It frequently happens that wind or an animal may force one or more risers to a leaning position and the resulting unbalanced weight may cause a long length of set-up pipe to twist so that all the risers along this length of pipe will fall. Moreover, on uneven or sloping terrain, the system is often not self-supporting and the risers must be held substantially upright in order to provide an even sprinkler pattern.

The present stabilizer 10 is designed to hold the risers 28 and sprinker heads 30 in their correct positions on any ground surface requiring irrigation. The stabilizer 10 is placed with the arms 20 straddling the riser 28 and is set to lean against the riser so that the bracket remains in place by virtue of such leaning position and the fact that the frame will ordinarily be constructed of heavy metal with the off-center weight of the riser-engaging element further ensuring retention of said leaning position. On sloping terrain the stabilizer 10 can be placed with both feet 32 on the ground surface, which is indicated at 34 in Fig. 2, in such a position that the riser 28 is held upright. The flaring guides 22 may have a secondary function in engaging the riser 28 at such an angle and also in allowing the bracket to hold risers of different size.

The instant stabilizer is of extremely simple construction, is easily handled and stored and one particular size of stabilizer is adaptable to many types of irrigation equipment.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

1. A stabilizer for use with a portable irrigation system having spaced, upright risers and sprinkler heads on the risers, said stabilizer comprising: a rigid frame of inverted V-shape and constituted solely of a pair of downwardly diverging legs with the axes thereof in a single general plane and interconnected by a bight portion at the top extremity of the frame; a riser-engaging element integral with said bight portion and extending from one side thereof; said element having arms defining a pocket opening in a direction normal to the general plane of said frame, whereby the stabilizer is adapted to straddle a riser in an irrigation system wherewith the stabilizer is used and to hold the riser generally upright while said legs are resting on the ground; said stabilizer being adapted to assume a leaning position when engaging said riser, and the off-center weight of said element on one side of said bight portion ensuring retention of said leaning position.

2. A stabilizer for use with a portable irrigation system having spaced, upright risers and sprinkler heads on said risers, said stabilizer comprising: a substantially rigid frame of inverted V-shape and constituted solely of a pair of downwardly diverging legs with the axes thereof in a single general plane and interconnected at one end by a bight portion; a riser-engaging element integral with said bight portion and extending from one side thereof; said element having a pair of arms at the top extremity of the frame including parallel spaced portions defining a pocket opening in a direction normal to the general plane of said frame; and curved guides constituting divergently flaring terminal portions of the arms; whereby said arms are adapted to guide said element into straddling relation with a riser in an irrigation system wherewith the stabilizer is used, and whereby such riser is thereafter held firmly in said pocket; said stabilizer being adapted to assume a leaning position when engaging said riser, and the off-center weight of said element on one side of said bight portion ensuring retention of said leaning position.

References Cited in the file of this patent

UNITED STATES PATENTS

| | | |
|---|---|---|
| 791,914 | Jones | June 6, 1905 |
| 1,058,090 | Nelson | Apr. 8, 1913 |
| 1,873,672 | Theys | Aug. 23, 1932 |
| 2,586,517 | Coles | Feb. 19, 1952 |
| 2,592,306 | Maze | Apr. 8, 1952 |
| 2,672,356 | Crockett | Mar. 16, 1954 |
| 2,721,764 | Wilson | Oct. 25, 1955 |

FOREIGN PATENTS

| | | |
|---|---|---|
| 120,523 | Australia | Nov. 15, 1945 |